(12) United States Patent
Fornoff et al.

(10) Patent No.: US 10,391,412 B2
(45) Date of Patent: Aug. 27, 2019

(54) AMUSEMENT RIDE WITH ROBOT SYSTEM

(71) Applicant: KUKA Deutschland GmbH, Augsburg (DE)

(72) Inventors: Peter Fornoff, Stephanskirchen (DE); Axel Tillmann, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 185 days.

(21) Appl. No.: 15/543,709

(22) PCT Filed: Jan. 13, 2016

(86) PCT No.: PCT/EP2016/000050
§ 371 (c)(1),
(2) Date: Oct. 16, 2017

(87) PCT Pub. No.: WO2016/113134
PCT Pub. Date: Jul. 21, 2016

(65) Prior Publication Data
US 2019/0111350 A1   Apr. 18, 2019

(30) Foreign Application Priority Data

Jan. 15, 2015   (DE) .................... 20 2015 000 333 U

(51) Int. Cl.
*A63G 31/00*   (2006.01)
*B25J 9/16*   (2006.01)
(Continued)

(52) U.S. Cl.
CPC ............. *A63G 31/00* (2013.01); *A63G 31/16* (2013.01); *B25J 9/162* (2013.01); *B25J 9/163* (2013.01);
(Continued)

(58) Field of Classification Search
CPC ........ A63G 31/00; A63G 31/02; A63G 31/04; A63G 31/08; A63G 31/16; G09B 9/14;
(Continued)

(56) References Cited

U.S. PATENT DOCUMENTS 5,791,903 A * 8/1998 Feuer .................. G09B 9/14
434/30
6,776,722 B2 * 8/2004 De-Gol .................. A63G 31/16
434/55

(Continued)

FOREIGN PATENT DOCUMENTS

DE   102011083596 A1   3/2013
DE   102012010856 A1   12/2013
(Continued)

OTHER PUBLICATIONS

Chinese Patent Office; Office Action in related Chinese Patent Application No. 201680016077.5 dated Nov. 23, 2018; 7 pages.
(Continued)

*Primary Examiner* — Kien T Nguyen
(74) *Attorney, Agent, or Firm* — Dorton & Willis, LLP

(57) ABSTRACT

An amusement ride includes a robot assembly having at least one multi-link robot arm with a base and a passenger holder for transporting at least one person. A controller for controlling the robot assembly includes a storage device for storing a limit of a working space arrangement having at least one work space, a distance device for determining a distance of the passenger holder from the working space arrangement, and a safety device for determining maximum permissible motion components in at least two spatial directions depending on the determined distance.

18 Claims, 1 Drawing Sheet

(51) Int. Cl.
*A63G 31/16* (2006.01)
*B25J 11/00* (2006.01)

(52) U.S. Cl.
CPC ........... *B25J 9/1669* (2013.01); *B25J 9/1674* (2013.01); *B25J 11/003* (2013.01)

(58) Field of Classification Search
CPC ......... G09B 19/165; B25J 9/18; B25J 9/1674; B25J 9/1675
USPC ......... 472/59–60, 130; 434/29, 55; 700/245, 700/246, 108, 181
See application file for complete search history.

(56) References Cited

U.S. PATENT DOCUMENTS

| | | | |
|---|---|---|---|
| 9,067,322 B2* | 6/2015 | Keibel | .................. B25J 9/1674 |
| 2010/0288067 A1* | 11/2010 | Hofmann | ............... B25J 9/1674 74/490.03 |
| 2013/0079167 A1 | 3/2013 | Hasenzahl | |
| 2013/0203020 A1* | 8/2013 | Buchstab | ............. G09B 19/165 434/33 |

FOREIGN PATENT DOCUMENTS

| | | |
|---|---|---|
| EP | 0997176 A2 | 5/2000 |
| EP | 1289616 A1 | 3/2003 |
| EP | 1437162 A2 | 7/2004 |
| EP | 1901150 A1 | 3/2008 |
| EP | 2574384 A1 | 4/2013 |

OTHER PUBLICATIONS

Chinese Patent Office; Search Report in related Chinese Patent Application No. 201680016077.5 dated Nov. 15, 2018; 2 pages.
European Patent Office; Search Report in International Patent Application No. PCT/EP2016/000050 dated Apr. 12, 2016; 6 pages.

* cited by examiner

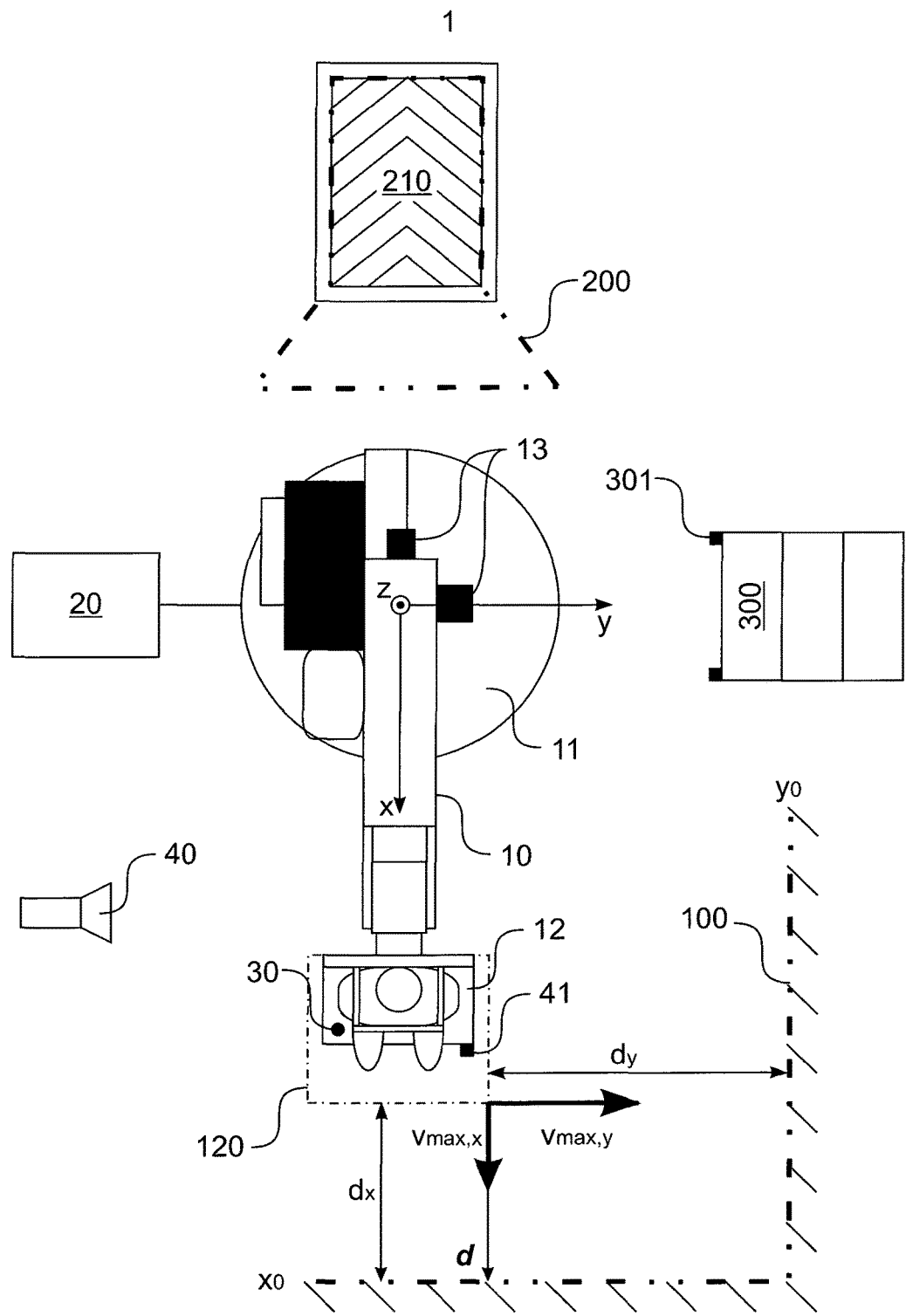

AMUSEMENT RIDE WITH ROBOT SYSTEM

CROSS-REFERENCE

This application is a national phase application under 35 U.S.C. § 371 of International Patent Application No. PCT/EP2016/000050, filed Jan. 13, 2016 (pending), which claims the benefit of German Patent Application No. DE 20 2015 000 333.8 filed Jan. 15, 2015, the disclosures of which are incorporated by reference herein in their entirety.

TECHNICAL FIELD

The present invention relates to an amusement ride with a robot system.

BACKGROUND

The published document EP 1 289 616 B1 discloses an amusement ride with a multi-link robot arm, which comprises a passenger holder for transporting a plurality of persons.

One object of the present invention is to improve a generic amusement ride, in particular, its operation.

SUMMARY

This engineering object is achieved, in particular, by means of an amusement ride as shown and described herein.

According to one aspect of the present invention, an amusement ride comprises a robot system with one or more multi-link robot arms, each having a base and a passenger holder for transporting one or more persons, and a controller for controlling the robot system.

The term "amusement ride" is defined in this context, in particular, as a system or an assembly or an apparatus for the amusement of people, in particular, in amusement parks or the like.

In one embodiment, one or more robot arms of the robot system comprise two, three, four, five, six or more articulated links, which are connected to each other, in particular, rotatably or, more specifically, pivotally.

The controller may be a central controller for controlling, in particular, in a coordinated way a plurality of robot arms of the robot system. Similarly the controller may also comprise a plurality of individual controllers, each controlling one robot arm of the robot system. According to one aspect, the controller is configured, in particular, in hardware and/or software to carry out a method, described herein.

In one embodiment at least one of the passenger holders comprises a seat and/or a fixing means, in particular, a belt, a strap or the like, for securing persons and/or a frame, in particular, a cage, for accommodating and/or protecting persons. In one embodiment at least one of the passenger holders is a passenger gondola.

In one embodiment a limit of a working space arrangement with one or more working spaces is specified, in particular, before and/or while the robot system is in operation or, more specifically, before or during a movement of the robot system. Correspondingly, in one embodiment the controller comprises a storage means for storing the limit of the working space arrangement.

The limit may be continuous or may comprise a plurality of sections, which are spaced apart from each other, in particular, (partial) limits of several non-contiguous working spaces of the working space arrangement. In one embodiment the parameters, which define the limit, in particular, the coordinates, are defined, in particular, are stored.

In one embodiment, in particular, while the robot system is in operation or, more specifically, is moving, a distance of one or more of the passenger holders from the working space arrangement, in particular, its limit, is determined. Correspondingly, in one embodiment the controller comprises a spacing means for determining the distance, in particular, while the robot system is in operation or, more specifically, is moving.

In one embodiment, in particular, while the robot system is in operation or, more specifically, is moving, the maximum allowable motion components in two or all three spatial directions are determined as a function of the determined distance. Correspondingly, in one embodiment the controller comprises a safety means for determining the maximum allowable motion components in the two or three spatial directions, in particular, while the robot system is in operation or, more specifically, is moving.

A motion component in one spatial direction can comprise, in particular, may be, in particular, a velocity component and/or acceleration component in this spatial direction. A spatial direction may be, in particular, a Cartesian spatial direction of the (Euclidean) space or, more specifically, the surrounding area of the amusement ride, in particular, an axis of an environment-fixed Cartesian coordinate system or inertial system. Similarly, a spatial direction may also be a direction of a moving, in particular, a robot system-fixed, in particular, a passenger holder-fixed, Cartesian or natural coordinate system. In this case a natural coordinate system can be formed in the standard way for those skilled in the art by means of the tangential, normal and binormal vector on a path of motion of the robot system, in particular, the passenger holder, where in this case the tangential vector is aligned with the current velocity; and the normal vector is aligned with the current acceleration; and the binormal vector forms with both of them an orthonormal system. Similarly, a spatial direction can also be a direction of a polar or cylindrical coordinate system or the like.

By determining the maximum allowable motion components as a function of the distance from the working space arrangement it is possible in one advantageous embodiment to determine a way to move the robot system or, more specifically, the passenger holder(s) in a particularly safe manner and, thus, to improve the operation of the amusement ride, in particular, its safety.

In one embodiment at least one motion component, in particular, an actual and/or commanded motion component of the robot system or a motion component, which is to be executed, is reduced in at least one of the spatial directions. In particular, the motion components, in particular, the actual and/or commanded motion components of the robot system or the motion components, to be executed, are reduced in two or three spatial directions, in each case as a function of the determined maximum allowable motion component in this spatial direction or these spatial direction(s), in particular, in each case to this determined maximum allowable motion component or to these determined maximum allowable motion components. Correspondingly, in one embodiment the controller comprises a reducing means for reducing a motion component, in particular, a commanded motion component of the robot system in one or more of the spatial directions, in particular, in all spatial directions, as a function of the determined maximum allowable motion component in this or the respective spatial direction, in particular, for reducing to this determined maximum allowable motion component.

The determination of the maximum allowable motion component(s) and in a further development the corresponding reduction of the motion component(s) may comprise in one embodiment a forward and/or backward transformation between the Euclidean space and the link coordinate space, in particular, the link angular space of the robot system and/or may take place in the Euclidean space or the link coordinate space, in particular, the link angular space. Correspondingly, in one embodiment a reduction of the motion components of the robot system in one or more of the spatial directions may also comprise, in particular, may also be, in particular, a reduction of these respective motion components in the link coordinate space, in particular, the link angular space of the robot system.

In one embodiment the spacing means comprises one or more positioning means, which are intended for determining a position and/or velocity of the passenger holder and in a further development are signal-connected to the safety means in a wireless or wired manner.

A positioning means may comprise, in particular, may be, in particular, a robot system-fixed positioning means, in particular, for detecting a link position and/or movement or, more specifically, velocity of a link of the robot system, in particular, a resolver or encoder, in particular, a drive-sided or transmission-sided relative or absolute resolver or encoder. In this way in one embodiment the position and/or velocity can be determined very precisely in an advantageous way, in particular, by means of a forward transformation.

In addition or as an alternative, an(other) positioning means may comprise, in particular, may be an environment-fixed positioning means, in particular, for optically detecting the passenger holder, in particular, a camera or a tracker. In one embodiment a position of the passenger holder and therefrom a distance from a working space can be determined directly by means of an environment-fixed positioning means, indirectly by means of a robot system-fixed positioning means or by means of a forward transformation.

In addition or as an alternative, in one embodiment the spacing means may comprise one or more distance sensors, in particular, optical, electromagnetic, capacitive and/or ultrasonic distance sensors. A distance sensor may be, in particular, a robot system-fixed distance sensor, in particular, a passenger holder-fixed distance sensor. In addition or as an alternative, an(other) distance sensor may be an environment-fixed distance sensor, in particular, for detecting a distance from the passenger holder. In particular, when a working space is defined by a wall or surface or is defined at a predetermined distance therefrom, a distance between the passenger holder and this working space can be determined in an advantageous way by a robot system-fixed distance sensor for detecting a distance from the wall or surface or by a wall-fixed or surface-fixed distance sensor for detecting a distance from the passenger holder.

In one embodiment a movement of the robot system, in particular, in a corresponding manual operating mode, can be specified arbitrarily by a person at least to some extent, in particular, with respect to a path velocity or a free movement in space. This can be done in advance and/or when the robot system is in operation or is moving, in particular, in advance by the passenger and/or by an operator when the robot system is in operation or is moving. In particular, to this end, in one embodiment the controller comprises an environment-fixed input means for specifying, in particular, at least to some extent at random, a movement of the robot system. In addition or as an alternative, this can also be done by the passenger when the robot system is in operation or is moving. In particular, for this purpose, in one embodiment the controller comprises additionally or alternatively a passenger holder-sided input means for specifying, in particular, at least to some extent at random, a movement of the robot system. The passenger holder-sided input means may comprise, in particular, a control stick, a joystick, a steering wheel or the like.

In one embodiment the controller comprises at least one automatic operating mode or is designed to be operated or to operate in at least one automatic operating mode, in particular, selectively to the aforementioned manual operating mode.

In one embodiment an automatic operating mode is an automatic operating mode for automatically traversing a predetermined path of the robot system at a predetermined velocity. In the manual operating mode a predetermined path can be traversed at an arbitrarily preset velocity.

In addition or as an alternative, an automatic operating mode may be an(other) automatic operating mode for automatically approaching a predetermined position of the passenger holder. In a further development the passenger holder is stopped at the predetermined position or can be switched over again into the manual operating mode; or the controller is designed for this purpose.

In a further development a path, which the robot system traverses in the automatic operating mode, is preset at random at least to some extent, in particular, by specifying one or more path-determining parameters at random, in particular, by means of a random generator, a stochastic table, or the like. Correspondingly in one embodiment the controller comprises a coincidence means for presetting at random the path on the basis of the robot system. In addition or as an alternative, the path can be preset on the basis of a simulation model. Correspondingly in one embodiment the controller comprises a simulation means for presetting the path of the robot system on the basis on a simulation model. This feature makes it possible to simulate, for example, a flight mode with stochastic influences or faults.

In one embodiment the base of at least one robot arm of the robot system is environment-fixed or, more specifically, fixed in inertial space. In addition or as an alternative, in one embodiment at least one (other) base of the robot system is movable.

A moveable base can be, in particular, rail bound. Then in a further development a power supply of the robot system comprises a rail, in particular, a carrier rail, on which the base is mounted so as to be movable, and/or a conductor rail that is at distance therefrom. Similarly, a movable base may comprise a carriage (not rail bound), and in a further development said carriage comprises one or more caterpillar tracks or chains and/or one or more wheels, which in one further development may have tires and/or may be so-called Mecanum wheels. Then, in a further development a power supply of the robot system comprises a robot arm-fixed, in particular, base-fixed or carriage fixed energy storage unit, in particular, an electric accumulator.

In one embodiment the amusement ride comprises at least one landing zone, in particular, a loading zone, in particular, a fill-up zone for getting in and/or out of the passenger holder with one or more passengers or rather riders. In a further development the landing zone comprises a platform for passengers. This platform is movable in a further development. In particular, in one embodiment said platform may be vertically and/or horizontally displaceable and/or rotatable. In a further development the platform comprises a conveyor belt, which is, in particular, at least partially horizontal and which makes it possible to advantageously get in and/or out of the absolutely or inertially moved passenger holder while said passenger holder rests, at least more or less, relative to the conveyor belt.

In addition or as an alternative, the landing zone in one embodiment comprises an engagement device, which can be connected, in particular, mechanically and/or electrically, to the passenger holder; and the passenger holder in a further development comprises a complementary device, which can be connected to this engagement device. Owing to an engagement device, which can be connected mechanically, in particular, in a positive locking and/or friction locking manner, to the passenger holder, in particular, its complementary device, it is possible to secure the passenger holder in an advantageous way, in particular, for getting in and/or out. An engagement device, which is electrically connected to the passenger holder, in particular, its complementary device, makes it possible to detect the presence or absence of the passenger holder in an advantageous way.

In one embodiment one or more working spaces of the working space arrangement are specified so as to be environment-fixed. This aspect allows, in particular, fixed obstacles to be considered, such as, for example, walls, ceilings, floors, fences or the like. In addition or as an alternative, in one embodiment one or more working spaces of the working space arrangement are specified so as to be movable, in particular, as a function of a position of the robot system or independently thereof. This aspect allows, in particular, moveable obstacles to be taken into account, for example, other robot arms of the robot system, vehicles or the like.

In one embodiment a maximum allowable (working space) velocity, in particular, in at least one spatial direction or direction-independent, is specified or stored for one or more of the working spaces of the working space arrangement; and in a further development this velocity is no more than 50 mm/s, in particular, at most 25 mm/s. Then in a further development the motion component of the robot system in at least one spatial direction, in particular, the motion component in a direction of an environment-fixed inertial system or in the tangential direction of a natural robot system-fixed coordinate system or the absolute velocity, is reduced to this maximum allowable working space velocity, when the distance between the passenger holder and this working space is negative or when the passenger holder is located at least partially in this working space. In this way it is possible in one embodiment to maintain a maximum working space velocity in a landing zone in an advantageous way and, in so doing, to ensure a safe boarding and/or exiting of the passenger holder or to maintain in a similar manner a maximum allowable working space velocity in an interaction zone and, in so doing, to enable a safe interaction out of the passenger holder. Correspondingly in one embodiment the storage means for storing a maximum allowable (working space) velocity within at least one working space of the working space arrangement is designed in a further development to reduce the reducing means for reducing a motion component, in particular, an actual and/or commanded motion component of the robot system or one, to be executed, in one or more of the spatial directions, in particular, in all spatial directions, as a function of the stored maximum allowable (working space) velocity, in particular, for reducing thereto.

In addition or as an alternative, in one embodiment one or more of the working spaces of the working space arrangement for the passenger holder may be blocked; or entry of the passenger holder into these working spaces may be or will be prohibited.

In one embodiment the determined distance of the passenger holder from the working space arrangement may comprise, in particular, may be the magnitude and/or the direction of a minimum, in particular, Euclidean distance or connecting straight line between one or more working spaces of the working space arrangement. In addition or as an alternative, the determined distance may comprise distance components in at least two, in particular, three, spatial directions to one or more working spaces of the working space arrangement. The term "distance component" is defined in the present case, in particular, in a manner known from the prior art, as the projection on the (shortest) distance vector in the respective spatial direction. Correspondingly the magnitude and direction of the minimum distance together determine the distance component in the three spatial directions; and conversely the distance component in the three spatial directions determines the magnitude and direction of the minimum distance. Therefore, the distance in the context of the present invention may be, in particular, a multi-dimensional variable, which may comprise, in particular, distance vectors, in particular, described by the magnitude and direction or their components in the spatial directions, to one or more working spaces of the working space arrangement. In one embodiment the distance is directed or, more specifically, is positive from the passenger holder to the working space arrangement. Correspondingly the (directed) distance may be, in particular, negative if the passenger holder is located in the working space arrangement.

In one embodiment the safety means is designed to execute a STOP0, STOP1 or STOP 2, if the determined distance and/or at least one maximum allowable motion component exceeds/exceed a predetermined limit value. In the case of a STOP0 in one embodiment at least one robot arm of the robot system is disconnected from a power supply and is stopped by means of applied brakes. In one embodiment in the case of a STOP1 at least one robot arm of the robot system is stopped by its drives or motor and is then disconnected from a power supply, where in this case brakes can also be applied. In the case of a STOP2 in one embodiment at least one robot arm of the robot system is stopped by its drives or motor without being subsequently disconnected from a power supply, where in this case brakes can also be applied.

A means in the context of the present invention may be configured in hardware and/or software to comprise, in particular, a processor unit, in particular, a digital processing unit, in particular, a microprocessor unit (CPU), which is data or signal connected preferably to a storage system and/or bus system, and/or one or more programs or program modules. The CPU can be configured to process commands, which are executed in a program that is stored in a storage system; to detect input signals from a data bus; and/or to emit output signals to a data bus. A storage system may comprise one or more, in particular, different storage media, in particular, optical, magnetic, solid state and/or other non-volatile media. The program may be such that it embodies or is capable of carrying out the methods described herein, so that the CPU can execute the steps of such methods and, thus, can operate, in particular, the amusement ride.

In one embodiment a maximum allowable motion component may be equal to zero; in a further development a maximum allowable motion component may also be negative or less than zero. As a result, in one embodiment a forced movement, opposite to the corresponding spatial direction, can be specified.

In one embodiment a working space converges on a landing zone, in particular, monotonically, preferably strictly monotonically, in particular, in a funnel-like manner. As a result, in one embodiment the landing zone may be designed or approached in an advantageous way, in particular, partly manually.

Other advantages and features will become apparent from the accompanying drawing and the description of the exemplary embodiments.

BRIEF DESCRIPTION OF THE DRAWINGS

FIG. 1 shows, partially in schematic form, an amusement ride according to one embodiment of the present invention.

DETAILED DESCRIPTION

FIG. 1 shows an amusement ride according to one embodiment of the present invention. Said amusement ride comprises a robot system with a multi-link robot arm in the form of a six-axis articulated arm robot 10, having a base 11 and a passenger holder 12 for transporting a person, and a controller with a control box 20 for controlling the robot system.

Furthermore, the controller also comprises a passenger holder-sided input means in the form of a joystick 30 for arbitrarily specifying a movement of the robot system in a manual operating mode.

The amusement ride comprises, by way of an example, a first landing zone for getting in and out of the passenger holder 12 with a movable platform in the form of a conveyor belt 210 and a second landing zone for getting in and out of the passenger holder 12; and this second landing zone comprises an engagement device 310, which can be connected to the passenger holder 12 by mechanical and electrical means.

In one exemplary embodiment the base 11 is environment-fixed. In one modification, which is not shown, said base may also be designed to be movable. In particular, said base may be on rails or comprise a carriage.

A limit of a working space arrangement with two working spaces 100, 200 is stored in a storage means in the form of a memory in the control box 20; and in FIG. 1 said limit is indicated in bold by dash-dotted lines.

In this embodiment the working space 100 is a blocked working space, which may be movable or environment-fixed; and the working space 200 is an environment-fixed working space, which converges on the first landing zone 210 in a funnel-like manner.

FIG. 1 shows three Cartesian spatial directions x, y and z of an environment-fixed inertial system. The working spaces 100, 200 can be defined by their coordinates with respect to this inertial system x, y, z. For example, the blocked working space 100 may be defined by the rule $x < x_0$ and $y < y_0$.

A maximum allowable (working space) velocity within the working space 200 is stored in the storage means; and in this embodiment said velocity is −50 mm/s in the x spatial direction.

The controller comprises robot arm-fixed positioning means in the form of resolvers or encoders 13 for determining angular positions and/or angular velocities of the six-axis robot 10, from which the position of the passenger holder 12, in particular, a frame 120, describing said passenger holder, in the inertial system x, y, z is determined by a forward transformation. In addition or as an alternative, the controller may comprise environment-fixed positioning means in the form of cameras 40, trackers, or the like for determining the position of the passenger holder 12, in particular, the frame 120, describing it. In addition or as an alternative, the controller may comprise passenger holder-fixed distance sensors 41.

A spacing means of the controller, where said spacing means comprises the robot arm-fixed positioning means 13, the environment-fixed positioning means 40 and/or the passenger holder-fixed distance sensors 41 as well as a suitably designed processing unit in the control box 20, determines a distance between the passenger holder 12, in particular, the frame 120, describing said passenger holder, and the working space arrangement with the working spaces 100, 200 or is designed in hardware and software for this purpose.

This determined distance may comprise or may be, in particular, the magnitude and the direction of a minimum connection vector d from the frame 120 to the limit of the respective working space or just as well its distance components in the spatial directions x, y, z, as shown in FIG. 1 as examples for the blocked working space 100 and the distance components $d_x$ and $d_y$.

Using the example of this blocked working space 100, an inventive method, executed by the controller, is explained in detail below; and in order to execute this method in the control box 20, a computer program product is provided with a program code, which is stored on a computer readable medium.

The distance is directed; that is, the magnitude of the shortest connection vector d from the frame 120 to the limit of the respective working space or, more specifically, the corresponding distance components are negative or, more specifically, less than zero, if the passenger holder 12 is at least partially within the corresponding working space.

A safety means in the form of a suitably configured processing unit in the control box 20 determines, as a function of this determined distance, the maximum allowable motion components in the three spatial directions, as shown in FIG. 1 by way of example for the maximum allowable velocity components $v_{max,\,x}$ and $v_{max,\,y}$ in the spatial directions x and y.

A maximum allowable motion component in one spatial direction may be, for example, proportional to the distance component in this spatial direction, as is indicated in FIG. 1 by way of example, for instance, in the form of $$v_{max,x} = k \cdot d_x$$

$$v_{max,y} = k \cdot d_y$$

with the constant k.

It has been found that in the exemplary embodiment the maximum allowable velocity component decreases as the distance decreases in the respective spatial direction; and upon reaching the limit said velocity is equal to zero; and on entering into the working space (d<0) it would even be negative or would drive the passenger holder out of the working space.

A reducing means in the form of a suitably configured processing unit in the control box 20 reduces, in particular, in the manual operating mode, in which the passenger commands the movement or, more specifically, the velocity of the passenger holder 12 with the joystick 30, the commanded velocity components to the determined maximum allowable velocity components in the corresponding spatial direction:

$$v_{desired,x} = \{v_{joystick,x} \Leftrightarrow v_{joystick,x} < v_{max,x}$$

$$v_{max,x} \Leftrightarrow v_{joystick,x} \geq v_{max,x}$$

$$v_{desired,y} = \{v_{joystick,y} \Leftrightarrow v_{joystick,y} < v_{max,y}$$

$$v_{max,y} \Leftrightarrow v_{joystick,y} \geq v_{max,y}$$

with the velocity components $v_{joystick,\ x}$, $v_{joystick,\ y}$, commanded by the joystick 30, and the reduced commanded velocity components $v_{desired,\ x}$, $v_{desired,\ y}$.

With respect to the working space 200 the controller works, in principle, in an analogous manner, where in this case the working space 200 is not blocked, but rather the direction-dependent maximum velocity of −50 mm/s in the x direction is preset in said controller.

If the distance from the frame 120 to the limit of the working space 200 is less than zero, that is, the passenger holder 12 has entered the funnel-like working space, then the velocity component in the x direction is reduced to the maximum velocity of −50 mm/s. In particular, the passenger cannot command with the joystick 30 a larger absolute velocity in the negative x direction. In addition or as an alternative, it may also be provided that the passenger cannot command a velocity component in the positive x direction, in order not to generate a velocity that is too large in relation to the conveyor belt 210. In the y direction the passenger may command with the joystick 30 only velocity components that move the passenger holder 12 within the funnel-like working space 200. If the passenger holder 12 approaches a side edge (on the left, on the right in FIG. 1), then a lateral movement beyond the edge is prevented by reducing, as a function of the distance, the y velocity component to zero.

Through a corresponding input of the passenger, an operator (not shown) or automatically, for example, after a specified period of time has lapsed, the controller switches over into an automatic operating mode, in which it automatically moves toward a predetermined position of the passenger holder in the first or second landing zone, where in this case the first or second landing zone is approached at random. In addition or as an alternative, the controller can automatically traverse a defined path in an automatic operating mode.

Even in the manual operating mode the controller can preset a path at random, for example, by exposing the responses to commands of the joystick 30 to stochastic disturbances; and additional stochastic motion components are impressed or the like, in order to simulate, for example, turbulence during a flight or the like.

The safety means of the controller executes a STOP0, if the determined distance and/or at least one maximum allowable motion component falls/fall below a predetermined limit value.

Although exemplary embodiments were explained in the foregoing description, it should be noted that a wide range of modifications are possible. Thus, an additional working space may also be predefined or saved, in particular, for the second landing zone 300.

The determination of the distance, the maximum allowable motion components $v_{max,\ x}$, and $v_{max,\ y}$ as a function of the determined distance, as well as the reduction of the motion components $v_{desired,\ x}$, and $v_{desired,\ y}$ as a function of these determined maximum allowable motion components are explained by means of one very simple example solely for illustrative purposes and for a more compact presentation. However, it would also be possible to make the presentation in a different way, for example, by means of another functional or tabular allocation of the distances or, more specifically, the distance components, the allowable motion components and the reduced commanded motion components. For example, only the maximum allowable motion components may also be determined in proportion to the magnitude $d = |d|$ of the distance vector d $$v_{max,x} = k \cdot d$$

$$v_{max,y} = k \cdot d$$

with the magnitude $d = \sqrt{(d_x + d_y + d_z)}$ and the distance component $d_z$ in the z direction.

Correspondingly it should be noted that these exemplary embodiments are merely examples that are not intended to restrict the scope of protection, the applications or the configuration in any way. Instead, the foregoing description gives the person skilled in the art a guide to put into practice at least one exemplary embodiment. At the same time various changes, in particular, with respect to the function and arrangement of the components described may be made without departing from the scope of protection, which is apparent from the claims and the combination of features that are equivalent to said claims.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS

10 robot arm
11 base
12 passenger holder
13 encoder/resolver
20 control box
30 joystick
40 camera
41 distance sensor
100, 200 working space
120 passenger holder frame
210 conveyor belt
300 landing zone
301 engagement device

What is claimed is:

1. An amusement ride, comprising:
   a robot system including at least one multi-link robot arm, the robot arm having a base and a passenger holder for transporting at least one person; and
   a controller for controlling the robot system, the controller comprising:
      a storage means for storing a boundary of a work space arrangement with at least one work space,
      a distance means for determining a distance of the passenger holder from the work space arrangement, and a safety means for determining maximum allowable motion components in at least two spatial directions depending on the determined distance.

2. The amusement ride of claim 1, wherein the controller further comprises a reducing means for reducing a motion component of the robot system in at least one spatial direction as a function of the determined maximum allowable motion component in the at least one spatial direction.

3. The amusement ride of claim 2, wherein the reducing means is for reducing the motion component of the robot system to the determined maximum allowable motion component.

4. The amusement ride of claim 1, wherein the distance means comprises at least one of:
   a) at least one position means for determining at least one of a position or velocity of the passenger holder; or
   b) at least one distance sensor.

5. The amusement ride of claim 4, wherein at least one of:
   the at least one position means is fixed relative to the robot system or the environment; or
   the at least one distance sensor is fixed relative to the robot system.

6. The amusement ride of claim 1, wherein the controller further comprises an input means for specifying a movement of the robot system.

7. The amusement ride of claim 6, wherein at least one of:
   the input means is disposed on the passenger holder; or
   the input means is for randomly specifying movement of the robot system.

8. The amusement ride of claim 1, wherein the controller comprises an automatic operating mode for at least one of:
   automatically moving along a predetermined path of the robot system; or
   automatically moving toward a predetermined position of the passenger holder.

9. The amusement ride of claim 8, wherein the controller further comprises at least one of:
   a randomizing means for randomly presetting the path of the robot system; or
   a simulation means for presetting the path of the robot system on the basis of a simulation model.

10. The amusement ride of claim 1, wherein the base of at the least one robot arm of the robot system is one of fixed relative to the environment, or is movable.

11. The amusement ride of claim 10, wherein the base is movable and is supported on rails or comprises a carriage.

12. The amusement ride of claim 1, further comprising:
   a landing zone for getting in and out of the passenger holder, the landing zone comprising at least one of:
   a platform; or
   an engagement device connectable to the passenger holder.

13. The amusement ride of claim 12, wherein at least one of:
   the platform is a moveable platform; or
   the engagement device is at least one of mechanically or electrically connectable to the passenger holder.

14. The amusement ride of claim 1, wherein at least one of:
   a) at least one work space of the work space arrangement is defined as environment-fixed; or
   b) at least one work space of the work space arrangement is defined as movable.

15. The amusement ride of claim 1, wherein the storage means stores a maximum allowable velocity within at least one work space of the work space arrangement.

16. The amusement ride of claim 1, wherein the determined distance comprises at least one of:
   a magnitude, a direction, or a magnitude and a direction of a minimum distance to at least one work space of the work space arrangement; or
   distance components in at least two spatial directions to at least one work space of the work space arrangement.

17. The amusement ride of claim 1, wherein the safety means executes a STOP 0, STOP 1, or STOP 2 command if at least one of the determined distance or at least one maximum allowable motion component falls below a predetermined limit value, wherein the commands are defined as:
   STOP 0—the at least one robot arm is disconnected from a power supply and is stopped by applied brakes;
   STOP 1—the at least one robot arm is stopped by drives or motors of the robot arm and is thereafter disconnected from a power supply; and
   STOP 2—the at least one robot arm is stopped by drives or motors of the robot arm and thereafter remains connected to a power supply.

18. A computer program product for operating an amusement ride as set forth in claim 1, the computer program product including program code stored in a non-transitory computer-readable data medium and that, when executed by the controller of the amusement ride, causes the controller to:
   determine the distance of the passenger holder from the work space arrangement; and
   determine the maximum allowable motion components in the at least two spatial directions as a function of the determined distance.

* * * * *